United States Patent
Sagona

(10) Patent No.: US 12,166,408 B2
(45) Date of Patent: Dec. 10, 2024

(54) BUCK CONVERTERS WITH LIGHT LOAD FUNCTION AND LOGIC

(71) Applicant: Hamilton Sundstrand Corporation, Charlotte, NC (US)

(72) Inventor: John Duward Sagona, Poplar Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 232 days.

(21) Appl. No.: 17/740,847

(22) Filed: May 10, 2022

(65) Prior Publication Data

US 2023/0369973 A1  Nov. 16, 2023

(51) Int. Cl.
  *H02M 3/157* (2006.01)
  *H02M 1/00* (2006.01)
  *H02M 3/158* (2006.01)

(52) U.S. Cl.
  CPC ....... *H02M 1/0032* (2021.05); *H02M 1/0009* (2021.05); *H02M 3/157* (2013.01); *H02M 3/158* (2013.01)

(58) Field of Classification Search
  CPC ............................ H02M 3/158; H02M 1/0032
  See application file for complete search history.

(56) References Cited

U.S. PATENT DOCUMENTS

| | | | |
|---|---|---|---|
| 10,461,647 B2 | 10/2019 | Baurle et al. | |
| 10,622,897 B2 | 4/2020 | Sagona | |
| 10,715,039 B1* | 7/2020 | Ilango | H02M 3/158 |
| 10,845,833 B1* | 11/2020 | Dietrich | H02M 3/157 |
| 2016/0276931 A1 | 9/2016 | Trichy et al. | |
| 2017/0012525 A1 | 1/2017 | Corleto et al. | |
| 2019/0028027 A1* | 1/2019 | Cho | H02M 3/158 |
| 2020/0091821 A1* | 3/2020 | Sagona | H02M 3/158 |

FOREIGN PATENT DOCUMENTS

| | | |
|---|---|---|
| CN | 113489318 A | 10/2021 |
| WO | 2021076350 A1 | 4/2021 |

OTHER PUBLICATIONS

Extended European Search Report dated Sep. 29, 2023, issued during the prosecution of European Patent Application No. EP 23172633.2.

* cited by examiner

*Primary Examiner* — Alex Torres-Rivera

(57) ABSTRACT

A method of DC-DC power conversion includes converting a DC link voltage to a DC output voltage for a load that is lower than the DC link voltage using a buck converter. The method includes controlling the buck converter in a normal switching mode in response to the DC link voltage, the DC output voltage, and the current of the load being within respective predetermined thresholds. The method includes controlling the buck converter in a light load switching mode in response the DC link voltage, the DC output voltage, and/or the current of the load being at or beyond the respective predetermined thresholds.

20 Claims, 2 Drawing Sheets

BUCK CONVERTERS WITH LIGHT LOAD FUNCTION AND LOGIC

BACKGROUND

1. Field

The present disclosure relates to power conversion, and more particularly to buck converters for stepping an input voltage down to a lower output voltage.

2. Description of Related Art

Buck converters can step down an input or link voltage to a lower output voltage. Buck synchronous and standard power converters with a wide input range, e.g. 90 VDC to 600 VDC, which is a much wider input range than in traditional applications, can cause problems on loads that vary from light to heavy during normal and transient conditions.

The conventional techniques have been considered satisfactory for their intended purpose. However, there is an ever present need for improved systems and methods for robust, smooth output voltage over a range of loads and input voltages for buck converters. This disclosure provides a solution for this need.

SUMMARY

A method of DC-DC power conversion includes converting a DC link voltage to a DC output voltage for a load that is lower than the DC link voltage using a buck converter. The method includes controlling the buck converter in a normal switching mode in response to the DC link voltage, the DC output voltage, and the current of the load being within respective predetermined thresholds. The method includes controlling the buck converter in a light load switching mode in response the DC link voltage, the DC output voltage, and/or the current of the load being at or beyond the respective predetermined thresholds.

Controlling the buck converter in the light load switching mode can include latching the light load switching mode in an enabled state upon occurrence of: the DC link voltage being at or above a predetermined high threshold, to keep the light load switching mode enabled even if the DC link voltage drops below the predetermined high threshold after latching, and the DC output voltage being at or below a predetermined light load voltage limit, to keep the light load switching mode enabled even if the DC output voltage exceeds the predetermined light load voltage limit after latching. Controlling the buck boost converter in the light load switching mode can include latching the light load switching mode in an enabled state upon occurrence of: the DC output voltage being above a predetermined output voltage limit, and load current being at or below a predetermined light load current limit. The method can include resetting the enabled state of the light load switching mode upon the DC output voltage being above the upper output voltage limit, the DC link voltage being at or below a predetermined lower light load limit, or the load current being at or above a predetermined lower light load limit, with a delay.

Controlling the buck converter in the normal switching mode can include controlling current to the load based on: measured current supplied to the buck converter at the DC Link Voltage, and a commanded inductor current for controlling current in a main inductor of the buck converter. The commanded inductor current for controlling the current in the main inductor can be derived from a voltage regulation control signal that is based on a differential of commanded output voltage and measured output voltage to the load.

Controlling the buck converter in the light load switching mode can include controlling current to the load based on: measured current supplied to the load, measured current supplied to the buck converter at the DC Link Voltage, and a commanded peak inductor light load command for controlling current in a main inductor of the buck converter.

A DC-DC conversion system includes a buck converter configured to receive a DC link voltage as input and to output a DC output voltage that is lower than the DC link voltage. A controller is operatively connected to the buck converter to control the buck converter. The controller includes logic configured to perform a method as those disclosed above.

The buck converter can include a positive DC link voltage node and a negative DC link voltage node. A switching component can connect the positive and negative DC link voltage nodes. The controller can be operatively connected to control switching of the switching component. The switching component can include a pair of switches connected in series. The buck converter can include a main inductor connecting a node between the two switches to a positive DC output node.

The system can include a first reluctance in the form of an inductor winding resistance of the main inductor. A second reluctance can be connected in series between the positive DC output node and the negative DC link voltage node. The negative DC link voltage node can be configured to serve as a negative DC output node. An input capacitor can connect between the positive and negative DC link voltage nodes in parallel with the switching component.

A first current sensor can be operatively connected to provide input indicative of current through the positive DC output node to a light load logic component of the controller. A second current sensor can be operatively connected to provide input indicative of current through the positive DC link voltage node to a current control logic component of the controller. The current control logic component can be operatively connected to control switching of the switching component.

A first voltage sensor can be operatively connected to provide input indicative of voltage across the positive DC output node and the negative DC link voltage node to the controller. A second voltage sensor can be operatively connected to provide input indicative of voltage across the positive and negative DC link voltage nodes to the controller.

A differential logic component can be operatively connected to output a differential signal indicative of difference between the input from the first voltage sensor and a commanded output voltage to a voltage regulation logic component configured to output a voltage control signal based on the differential signal. A light load limiter can be configured to output a light load current limiting signal. A switch logic component can be operatively connected to receive input from the light load logic component, from the light load limiter, and from the voltage control logic component, wherein the switch logic component is configured to switch between sending output from the light load limiter or from the voltage regulation logic component to the current control logic component. The light load logic component can be operatively connected to receive input from the first voltage sensor, and to control the switch logic component between the light load switching mode and the normal switching mode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 2:
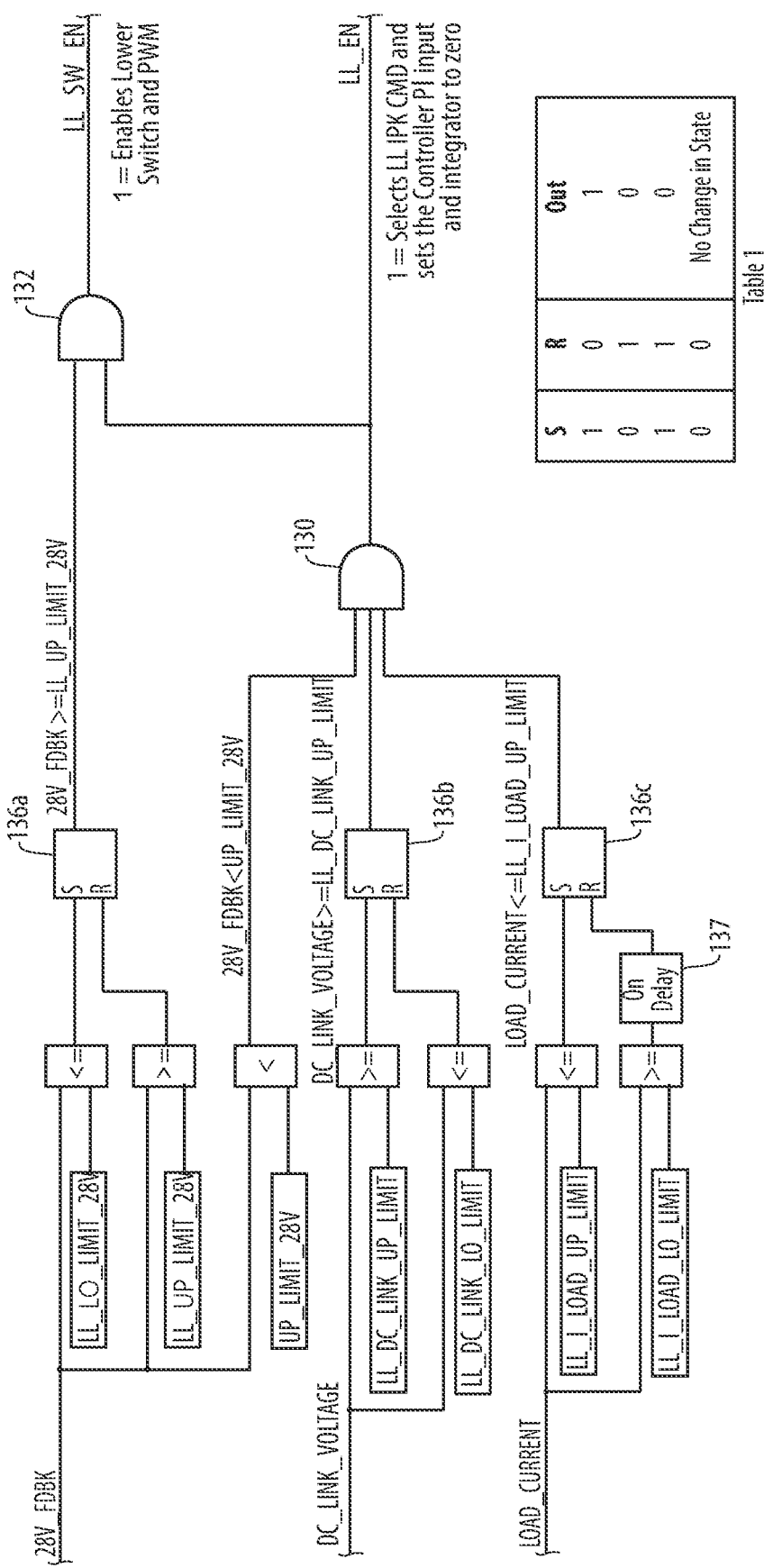
FIG. 2 is a schematic view of the logic in the controller of FIG. 1 for enabling and disabling the light load mode based on the logic states shown in TABLE 1.

TABLE 1 shows the logic states for the set/reset logic components of FIG. 2.

DETAILED DESCRIPTION OF THE PREFERRED EMBODIMENTS

Figure 1:
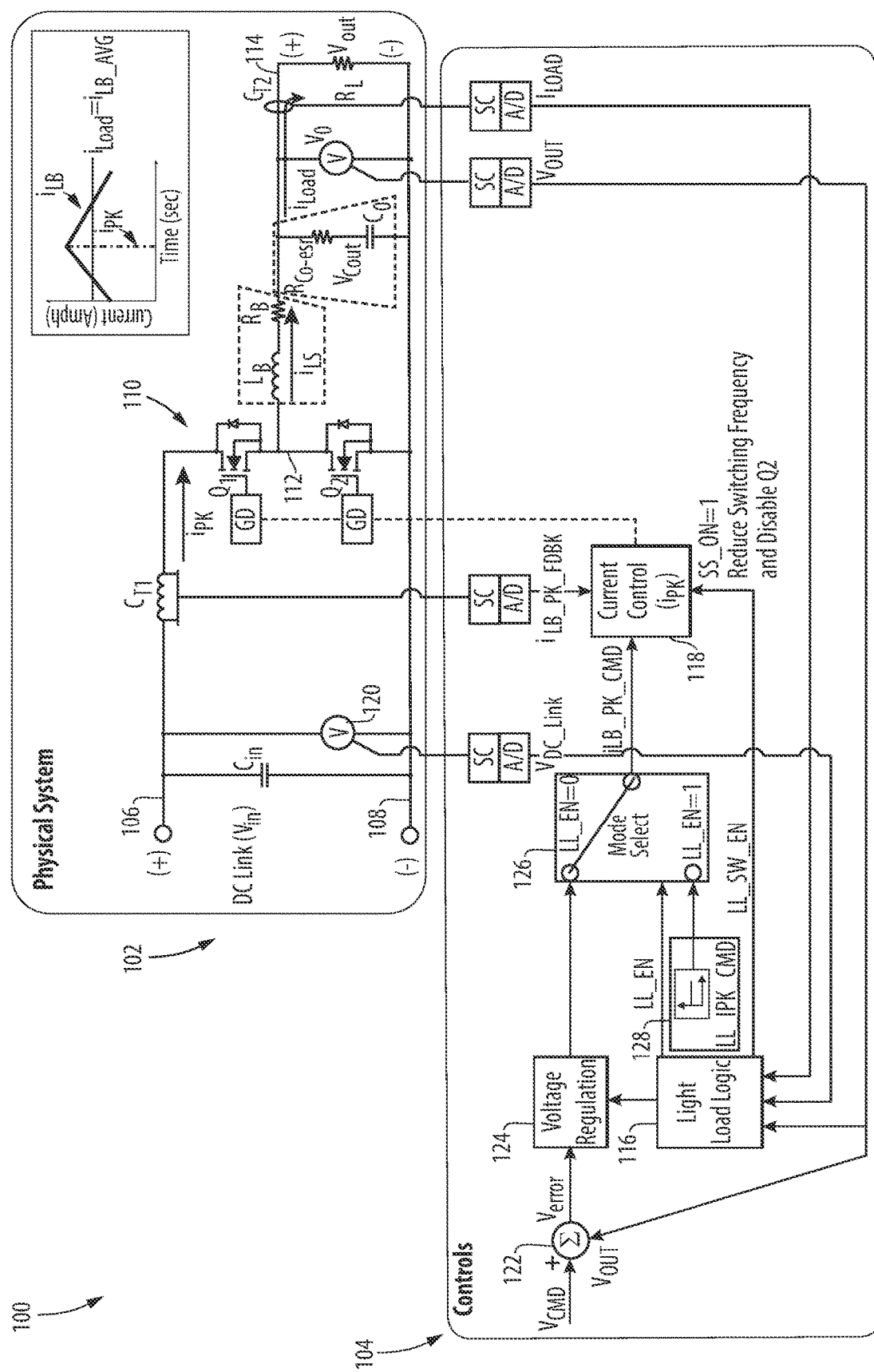
FIG. 1 is a schematic view of an embodiment of a system constructed in accordance with the present disclosure, showing the buck converter and the controller.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2 and TABLE 1, as will be described. The systems and methods described herein can be used to provide a light load mode for synchronous/standard buck power converters with wide input voltage ranges, e.g. where the input voltage ranges from 90 VDC to 600 VDC.

The DC-DC conversion system 100 includes a buck converter 102 configured to receive a DC link voltage as input and to output a DC output voltage that is lower than the DC link voltage. A controller 104 is operatively connected to the buck converter 102 to control the buck converter 102. The controller 104 includes logic configured to control the buck converter 102 in a normal switching mode in response to the DC link voltage, the DC output voltage, and the current of the load being within respective predetermined thresholds. The controller 104 also includes logic configured to control the buck converter 102 in a light load switching mode in response to in response the DC link voltage, the DC output voltage, and/or the current of the load being at or beyond the respective predetermined thresholds.

The buck converter 102 includes a positive DC link voltage node 106 and a negative DC link voltage node 108. A switching component 110 connects the positive and negative DC link voltage nodes 106, 108. The controller 104 is operatively connected to control switching of the switching component 110. The switching component 110 includes a pair of switches $Q_1$ and $Q_2$ connected in series across the positive and negative DC link voltage nodes 106, 108. The switching components $Q_1$ and $Q_2$ can be any suitable type of switches, such as solid state switches where the gates are connected to the controller 104 so the controller 104 can control the switching of the switching components to produce the output voltage at the DC output nodes 114, 108.

The buck converter 102 includes a main inductor LB connecting a node 112 between the two switches $Q_1$ and $Q_2$ to a positive DC output node 114. A first reluctance indicated with a dashed box in FIG. 1 includes the main inductor LB, wherein RB is the coil resistance of the main inductor LB. A second reluctance (the capacitor CO and its associated internal resistance, RCo-esr as indicated by a dashed line box around them in FIG. 1) is connected across the positive DC output node 114 and the negative DC link voltage node 108, which is configured to serve as a negative DC output node. The second reluctance is connected in parallel with the load (represented in FIG. 1 by $R_L$). Those skilled in the art will readily appreciate that the load is not necessarily part of the buck converter 102, and can be any suitable load to be powered by the output voltage and current of the cuck converter 102. An input capacitor $C_{in}$ connects between the positive and negative DC link voltage nodes 106, 108 in parallel with the switching component 110.

While shown and described with a buck converter 100 (in FIG. 1) that is a synchronous buck converter, those skilled in the art will readily appreciate that the second switch $Q_2$ can be changed to a diode, pointed upward as oriented in FIG. 1, to make a standard buck converter which can operate using similar methods as disclosed herein without departing from the scope of this disclosure.

A first current sensor $C_{T2}$ is operatively connected to provide input indicative of current through the positive DC output node 114 to a light load logic component 116 of the controller 104. A second current sensor $G_{T1}$ is operatively connected to provide input indicative of current through the positive DC link voltage node 106 to a current control logic component 118 of the controller 104. The current control logic component 118 is operatively connected to control switching of the switching component 110.

A first voltage sensor $V_O$ is operatively connected to provide input indicative of voltage across the positive DC output node 114 and the negative DC link voltage node 108 to the controller 104. A second voltage sensor 120 is operatively connected to provide input indicative of voltage across the positive and negative DC link voltage nodes 106, 108 to the controller 104.

A differential logic component 122 is operatively connected to output a differential signal ($V_{ERROR}$ in FIG. 1) indicative of difference between the input from the first voltage sensor $V_O$ and a commanded output voltage $V_{CMD}$ to a voltage regulation logic component 124 configured to output a voltage control signal based on the differential signal $V_{ERROR}$. The control algorithm inside block 124 can be a standard control algorithm, i.e. a proportional plus integral, although any other suitable type of control algorithm can be used. A switch logic component 126 is operatively connected to receive input from the light load logic component 116, from the voltage control logic component 124, and from a light load limiter 128 (LL_IPK_CMD in FIG. 1). The switch logic component 126 is configured to switch between sending output from the light load limiter 128 or from the voltage regulation logic component 124 to the current control logic component 118. The light load logic component 116 is operatively connected to receive input from the second voltage sensor 120, and to control the switch logic component 126 between the light load switching mode and the normal switching mode.

With continued reference to FIG. 1, a method of DC-DC power conversion includes converting a DC link voltage to a DC output voltage for a load that is lower than the DC link voltage using a buck converter, e.g. buck converter 102. The method includes controlling the buck converter in a normal switching mode in response to the DC link voltage, e.g. at the voltage sensor 120) the DC link voltage, the DC output voltage (from the sensor $V_O$), and the current of the load (from sensor $C_{T2}$) being within respective predetermined thresholds. The method also includes controlling the buck converter in a light load switching mode in response to the DC link voltage, the DC output voltage, and/or the current of the load being at or beyond the respective predetermined thresholds.

With reference now to FIG. 2, controlling the buck converter in the light load switching mode includes latching the light load switching mode in an enabled state (LL_EN=1 in FIGS. 1 and 2) upon occurrence of the DC link voltage (DC_LINK_VOLTAGE in FIG. 2, as sensed by the sensor 120 in FIG. 1) being at or above a predetermined high threshold (LL_DC_LINK_UP_LIMIT), to keep the light load switching mode enabled even if the DC link voltage drops below the predetermined high threshold after latching; and the DC output voltage (28V_FDBK in FIG. 2, from sensor Vo in FIG. 1) being at or below a predetermined light load voltage limit (LL_LO_LIMIT_28V), to keep the light load switching mode enabled (LL_SW_EN=1) even if the DC output voltage drops below the predetermined light load voltage limit after latching.

A third enablement requirement for enablement of the light load switching mode is the DC output voltage (28V_FDBK in FIG. 2, at $V_O$ in FIG. 1) being below a predetermined output voltage limit (28V_FDBK<UP_LIMIT_28V in FIG. 2). A fourth enablement requirement for enablement of the light load switching mode is load current (LOAD_CURRENT in FIG. 2, sensed by sensor $C_{T2}$ in FIG. 1) being at or below a predetermined light load current limit (LL_I_LOAD_UP_LIMIT in FIG. 2).

The 28V_FDBK<UP_LIMIT_28V condition, the DC_LINK_VOLTAGE>=LL_DC_LINK_UP_LIMIT condition, and the LOAD_CURRENT<=LL_I_LOAD_LIMIT condition are inputs for a first AND gate 130. If the inputs to the first AND gate 130 are all 1, then the LL_EN condition of FIG. 1 is set to 1. The output of the first AND gate 130 is an input to the second AND gate 132.

With continued reference now to FIG. 2, the 28V_FDBK<=LL_LO_LIMIT-28V condition is an input to the second AND gate 132. If all of the inputs to the second AND gate 132 are 1, then the output of the second AND gate 132, namely LL_SW_EN in FIGS. 1 and 2, is 1 enabling the light load mode, enabling the light load limiter 128 as input for the current control logic component 118.

TABLE 1 provides the logic for the S and R inputs for the set/reset logic boxes 136a-d, and the corresponding outputs. This selects the LL_IPK_CMD and sets the controller PI input and integrator to zero for the current control component 118.

With continued reference to FIG. 2, LL_EN is an input to the voltage regulation logic component 124 of FIG. 1. When LL_EN is set to 1 as output from the second AND gate 132, the voltage regulation logic component 124 is held in reset (Verror=0, PI controller or any other type of integration states are held to zero). LL_EN is an input to the switch logic component 126 of FIG. 1 and to the current control logic component 118. When LL_EN=1, The LL_IPK_CMD is selected (in the switch logic component 126) and the pulse width modulation (PWM) is enabled by the current control logic component 118.

The method includes resetting the enabled state of the light load switching mode LL_SW_EN to 0 upon the DC output voltage (28V_FDBK in FIG. 1) being above the upper output voltage limit (28V_FDBK>=LL_UP_LIMIT_28V). By operation of the first AND gage 130, LL_SW_EN, can also be reset if the output voltage is above its predetermined limit (e.g. if 28V_FDBK<UP_LIMIT_28V is no longer true), if the DC link voltage is at or below a predetermined lower light load limit (DC_LINK_VOLTAGE<=LL_DC_LINK_LO_LIMIT), or if the load current is at or above a predetermined lower light load limit (LOAD_CURRENT>=LL_I_LOAD_LO_LIMIT), with a delay to cancel out noise as indicated in box 137. If any of these last mentioned three conditions are 0, the output of AND gate 130 will be zero, and the LL_EN state of FIGS. 1 and 2 will be disabled. The set reset logic for the set reset components 136a, 136b, and 136c is shown in TABLE 1.

Controlling the buck converter in the normal switching mode includes controlling current to the load based on measured current supplied to the buck converter 102 at the DC Link Voltage (using sensor feedback from sensor $C_{T1}$ of FIG. 1), and a commanded inductor current from the voltage regulation component 124 for controlling current in the main inductor $L_B$ of the buck converter 102. The commanded inductor current for controlling the current in the main inductor is derived from a voltage regulation control signal (from component 124 in FIG. 1) that is based on a differential of commanded output voltage and measured output voltage to the load (Verror in FIG. 1).

Controlling the buck converter 102 in the light load switching mode includes controlling current to the load based on measured current supplied to the load (from sensor $C_{T2}$ in FIG. 1), measured current supplied to the buck converter 102 at the DC Link Voltage (from sensor $C_{T1}$ of FIG. 1), and a commanded peak inductor light load command for controlling current in a main inductor of the buck converter (LL_PK_CMD in FIG. 1). The LL_IPK_CMD is a constant value and dependent on application and should be greater than the LL_I_LOAD_UP_LIMIT.

Systems and method disclosed herein provide potential benefits including the following. It is possible to operate the buck converter 102 with a large input voltage range, e.g. 6 to 1. Those skilled in the art will readily appreciate that specific voltages mentioned herein are suitable, e.g. for aerospace applications, but that any other suitable voltages or voltage ranges can be used without departing from the scope of this disclosure.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "logic," "circuit," "module," "component" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for a light load mode for synchronous/standard buck power converters with wide input voltage ranges, e.g. where the input voltage ranges from 90 VDC to 600 VDC. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of DC-DC power conversion comprising:
   converting a DC link voltage to a DC output voltage for a load that is lower than the DC link voltage using a buck converter;
   controlling the buck converter in a normal switching mode in response to the DC link voltage, the DC output voltage, and a current of the load being within respective predetermined thresholds; and
   controlling the buck converter in a light load switching mode in response to at least one of the DC link voltage, the DC output voltage, or the current of the load being at or beyond at least one of the respective predetermined thresholds;
   wherein controlling the buck converter in the light load switching mode includes controlling the current to the load based on:
      measured current supplied to the load,
      measured current supplied to the buck converter at the DC link voltage, and
      a commanded peak inductor light load command for controlling current in a main inductor of the buck converter.

2. The method as recited in claim 1, wherein controlling the buck converter in the normal switching mode includes controlling the current to the load based on:
   the measured current supplied to the buck converter at the DC link voltage, and
   a commanded inductor current for controlling current in the main inductor of the buck converter.

3. The method as recited in claim 2, wherein the commanded inductor current for controlling the current in the main inductor is derived from a voltage regulation control signal that is based on a differential of commanded output voltage and measured output voltage to the load.

4. The method as recited in claim 1, wherein controlling the buck converter in the light load switching mode includes latching the light load switching mode in an enabled state upon occurrence of:
   the DC link voltage being at or above a predetermined high threshold to keep the light load switching mode enabled even if the DC link voltage drops below the predetermined high threshold after latching; and the DC output voltage being at or below a predetermined light load voltage limit to keep the light load switching mode enabled even if the DC output voltage exceeds the predetermined light load voltage limit after latching.

5. The method as recited in claim 4, wherein controlling the buck converter in the light load switching mode includes latching the light load switching mode in the enabled state upon occurrence of:
the DC output voltage being below a predetermined output voltage limit; and
the current of the load being at or below a predetermined light load current limit.

6. The method as recited in claim 5, further comprising:
resetting the enabled state of the light load switching mode upon the DC output voltage being above the predetermined output voltage limit, the DC link voltage being at or below a predetermined lower light load voltage limit, or the current of the load being at or above a predetermined lower light load current limit, with a delay.

7. The method as recited in claim 4, wherein controlling the buck converter in the normal switching mode includes controlling the current to the load based on:
the measured current supplied to the buck converter at the DC link voltage, and
a commanded inductor current for controlling current in the main inductor of the buck converter.

8. The method as recited in claim 7, wherein the commanded inductor current for controlling the current in the main inductor is derived from a voltage regulation control signal that is based on a differential of commanded output voltage and measured output voltage to the load.

9. A method of DC-DC power conversion comprising:
converting a DC link voltage to a DC output voltage for a load that is lower than the DC link voltage using a buck converter;
controlling the buck converter in a normal switching mode in response to the DC link voltage, the DC output voltage, and a current of the load being within respective predetermined thresholds; and
controlling the buck converter in a light load switching mode in response to at least one of the DC link voltage, the DC output voltage, or the current of the load being at or beyond at least one of the respective predetermined thresholds;
wherein controlling the buck converter in the light load switching mode includes latching the light load switching mode in an enabled state upon occurrence of:
the DC link voltage being at or above a predetermined high threshold to keep the light load switching mode enabled even if the DC link voltage drops below the predetermined high threshold after latching; and
the DC output voltage being at or below a predetermined light load voltage limit to keep the light load switching mode enabled even if the DC output voltage exceeds the predetermined light load voltage limit after latching.

10. The method as recited in claim 9, wherein controlling the buck converter in the light load switching mode includes latching the light load switching mode in the enabled state upon occurrence of:
the DC output voltage being below a predetermined output voltage limit; and
the current of the load being at or below a predetermined light load current limit.

11. The method as recited in claim 10, further comprising:
resetting the enabled state of the light load switching mode upon the DC output voltage being above the predetermined output voltage limit, the DC link voltage being at or below a predetermined lower light load voltage limit, or the current of the load being at or above a predetermined lower light load current limit, with a delay.

12. The method as recited in claim 9, wherein controlling the buck converter in the light load switching mode includes controlling the current to the load based on:
measured current supplied to the load, and
measured current supplied to the buck converter at the DC link voltage.

13. The method as recited in claim 9, wherein controlling the buck converter in the normal switching mode includes controlling the current to the load based on:
a measured current supplied to the buck converter at the DC link voltage, and
a commanded inductor current for controlling current in a main inductor of the buck converter.

14. A DC-DC conversion system comprising:
a buck converter configured to receive a DC link voltage as input and to output a DC output voltage that is lower than the DC link voltage; and
a controller operatively connected to the buck converter and configured to control the buck converter, wherein the controller includes logic configured to:
control the buck converter in a normal switching mode in response to the DC link voltage, the DC output voltage, and a current of a load being within respective predetermined thresholds; and
control the buck converter in a light load switching mode in response to at least one of the DC link voltage, the DC output voltage, or the current of the load being at or beyond at least one of the respective predetermined thresholds; and
wherein, to control the buck converter in the light load switching mode, the logic is configured to control the current to the load based on:
measured current supplied to the load,
measured current supplied to the buck converter at the DC link voltage, and
a commanded peak inductor light load command for controlling current in a main inductor of the buck converter.

15. The system as recited in claim 14, wherein:
the buck converter includes a positive DC link voltage node, a negative DC link voltage node, and a switching component connecting the positive and negative DC link voltage nodes; and
the controller is operatively connected to control switching of the switching component.

16. The system as recited in claim 15, wherein:
the switching component includes a pair of switches connected in series; and
the main inductor connects a node between the pair of switches to a positive DC output node.

17. The system as recited in claim 16, further comprising:
a first reluctance comprising an inductor winding resistance of the main inductor;
a second reluctance connected in series between the positive DC output node and the negative DC link voltage node, wherein the negative DC link voltage node is configured to serve as a negative DC output node; and an input capacitor connecting between the positive and negative DC link voltage nodes in parallel with the switching component.

18. The system as recited in claim 17, further comprising:
a first current sensor operatively connected to provide input indicative of current through the positive DC output node to a light load logic component of the controller; and
a second current sensor operatively connected to provide input indicative of current through the positive DC link voltage node to a current control logic component of the controller, wherein the current control logic component is operatively connected to control switching of the switching component.

19. The system as recited in claim 18, further comprising:
a first voltage sensor operatively connected to provide input indicative of voltage across the positive DC output node and the negative DC link voltage node to the controller; and
a second voltage sensor operatively connected to provide input indicative of voltage across the positive and negative DC link voltage nodes to the controller.

20. The system as recited in claim 19, further comprising:
a differential logic component operatively connected to output a differential signal indicative of difference between the input from the first voltage sensor and a commanded output voltage to a voltage regulation logic component configured to output a voltage control signal based on the differential signal;
a light load limiter configured to output a light load current limiting signal; and
a switch logic component operatively connected to receive input from the light load logic component, the light load limiter, and the voltage regulation logic component, wherein the switch logic component is configured to switch between sending output from the light load limiter or from the voltage regulation logic component to the current control logic component;
wherein the light load logic component is operatively connected to receive the input from the first voltage sensor and to control the switch logic component between the light load switching mode and the normal switching mode.

* * * * *